R. B. SMITH.
TIRE TIGHTENER.
APPLICATION FILED JUNE 18, 1909.
976,514. Patented Nov. 22, 1910.
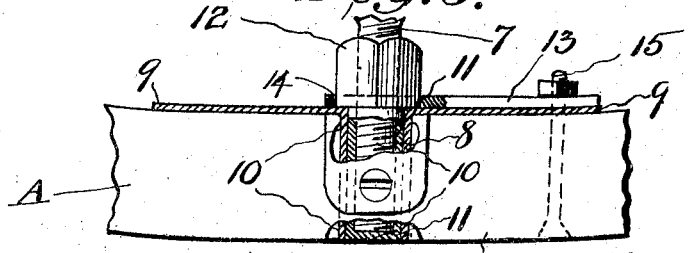
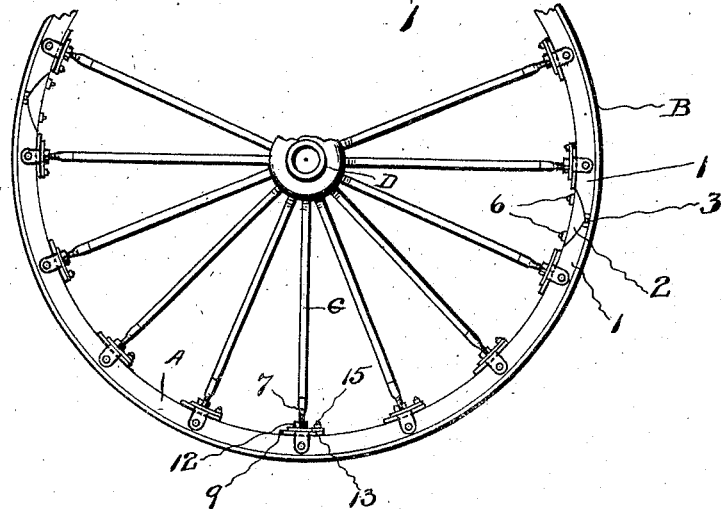
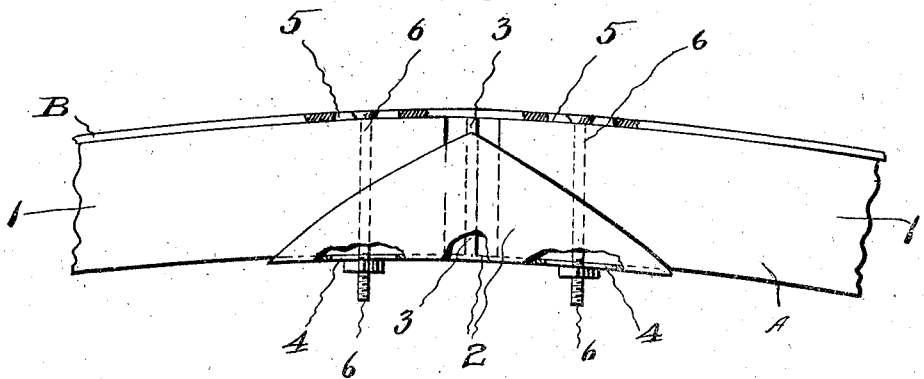
WITNESSES
Jos. H. Blackwood
W. O. Blackwood
INVENTOR:
Robert Benjamin Smith
by James K. Polk
Attorney

UNITED STATES PATENT OFFICE.

ROBERT BENJAMIN SMITH, OF EASLEY, SOUTH CAROLINA.

TIRE-TIGHTENER.

976,514.  Specification of Letters Patent.  Patented Nov. 22, 1910.

Application filed June 18, 1909. Serial No. 502,914.

*To all whom it may concern:*

Be it known that I, ROBERT BENJAMIN SMITH, a citizen of the United States, and a resident of Easley, in the county of Pickens and State of South Carolina, have invented certain new and useful Improvements in Tire-Tighteners, of which the following is a specification.

My invention relates to devices carried by the wheel of a vehicle for expanding the fellies and thereby tightening the tire, and it consists, essentially, in constructing the felly in segments, and having the ends secured in casings and to the tire by means of bolts, the tire and casing being provided with longitudinal slots to admit of movement of the bolts when expanding the fellies. To expand the felly, I provide the spokes with sockets connected with the fellies by threaded fastenings revolubly mounted on the felly and having shoulders to receive a wrench to turn them. I also provide clamps for engaging said shoulders to prevent the threaded fastenings from turning when the felly has been expanded.

My invention will be described in detail hereinafter, and illustrated in the accompanying drawings, in which—

Figure 1 is a view of a wheel showing my improvements applied thereto; Fig. 2, a fragmental sectional view of the wheel-rim showing the means for connecting the ends of the fellies to the tire; and Fig. 3, a fragmental view of the wheel-rim showing the preferred means for securing the spokes thereto.

In the drawings similar reference characters indicate corresponding parts throughout all of the views.

The felly of the wheel A made according to my invention is formed of two or more segments 1, loosely mounted at their ends in casings 2, having a central partition 3 to engage the ends of the felly and limit their movements in the casings. The casings 2 and tire B are provided with longitudinal slots 4 and 5, respectively, and 6 indicates bolts secured in the ends of the felly segments and engaging slots 4 and 5. It will be apparent that by this construction the felly segments are capable of movement independently of the tire B when the nuts on bolts 6 are loosened to release them from engagement with the casings 2. The spokes C are secured to hub D in the usual manner, but have their outer ends secured in sockets 7. In the form shown in Figs. 3 and 4 the end of each socket 7 is reduced and externally threaded, as shown at 8.

9 indicates a plate provided with a tubular socket 10, and 11 is an internally-threaded sleeve revolubly mounted in tubular socket 10 and provided with a shoulder 12 having a plurality of oppositely disposed facets to receive a wrench to turn the sleeve in expanding the felly to tighten the tire on the wheel.

13 indicates a clamping-plate provided with a hole 14 in one end to engage shoulder 12 and having its other end secured to a bolt 15, secured in felly segment 1 and through plate 9 and held in place by means of a nut secured on the bolt. The clamping-plate 13 prevents the sleeve from accidental turning, but when it is desired to tighten the tire the nut is removed from bolt 15 and the plate 13 lifted from engagement with the shoulder 12 and bolt 15, while the sleeve is rotated.

Having thus described my invention, what I claim is—

A tire-tightener comprising the combination with the spokes of a wheel and felly, a plate secured opposite the outer end of each spoke and having a tubular socket extending into the felly, an interiorly threaded sleeve revolubly mounted in the socket, a shoulder on the inner end of the sleeve larger in diameter than the sleeve to limit the movement of the sleeve into the socket, said shoulder having oppositely disposed facets, and the spokes formed with threaded ends engaging the interior threads in said sleeves, substantially as shown and described.

In witness whereof, I have hereunto set my hand in presence of two subscribing witnesses.

ROBERT BENJAMIN SMITH.

Witnesses:
C. T. MARTIN,
R. F. SMITH.